United States Patent
Sick et al.

(10) Patent No.: US 11,945,136 B2
(45) Date of Patent: Apr. 2, 2024

(54) SYSTEM AND METHOD FOR PROCESSING ARTIFICIAL TURF

(71) Applicant: POLYTEX SPORTBELÄGE PRODUKTIONS-GMBH, Grefrath (DE)

(72) Inventors: Stephan Sick, Baden-Baden (DE); Tom Strange Beck, Silkeborg (DK)

(73) Assignee: Formaturf GmbH, Essen (DE)

( * ) Notice: Subject to any disclaimer, the term of this patent is extended or adjusted under 35 U.S.C. 154(b) by 0 days.

(21) Appl. No.: 18/001,146

(22) PCT Filed: Jul. 8, 2021

(86) PCT No.: PCT/EP2021/068946
§ 371 (c)(1),
(2) Date: Dec. 8, 2022

(87) PCT Pub. No.: WO2022/008637
PCT Pub. Date: Jan. 13, 2022

(65) Prior Publication Data
US 2023/0211524 A1    Jul. 6, 2023

(30) Foreign Application Priority Data

Jul. 10, 2020    (EP) .................................... 20185342

(51) Int. Cl.
*B02C 19/00*        (2006.01)
*B01F 27/70*        (2022.01)
(Continued)

(52) U.S. Cl.
CPC .............. *B29B 17/02* (2013.01); *B01F 27/70* (2022.01); *B01F 35/92* (2022.01);
(Continued)

(58) Field of Classification Search
CPC ....... B02C 19/186; B02C 23/38; B02C 23/08; B02C 23/10; B02C 13/06; B02C 13/10; B29B 17/02; B29B 17/0026; B01F 27/70
See application file for complete search history.

(56) References Cited

U.S. PATENT DOCUMENTS 8,726,602 B2   5/2014   DeLong
8,809,405 B2   8/2014   Taylor
(Continued)

FOREIGN PATENT DOCUMENTS

DE   102006015541 A1   10/2007
EP       2186942 A1    5/2010
(Continued)

OTHER PUBLICATIONS

Decision to Grant dated Jul. 21, 2022 issued in related European patent application No. 20185342.1.
(Continued)

*Primary Examiner* — Faye Francis
(74) *Attorney, Agent, or Firm* — Harness, Dickey & Pierce, P.L.C.

(57) ABSTRACT

A system and method for processing an artificial turf, and a product produced by the method, is provided. The method includes providing an artificial turf having an infill, separating at least a portion of the infill from the artificial turf, downsizing the artificial turf into artificial turf fragments and rotationally mixing and translating, by a melt system, the artificial turf fragments at a pressure less than a maximum predefined pressure to form a melt. The maximum predefined pressure is between about 0.08-20 bar.

12 Claims, 9 Drawing Sheets

(51) Int. Cl.
  *B01F 35/92* (2022.01)
  *B02C 19/18* (2006.01)
  *B02C 23/08* (2006.01)
  *B29B 17/00* (2006.01)
  *B29B 17/02* (2006.01)
  *B29B 17/04* (2006.01)
  *E04F 15/02* (2006.01)
  *E04F 15/10* (2006.01)
  *B01F 35/90* (2022.01)
  *E01C 13/08* (2006.01)

(52) U.S. Cl.
  CPC ........ *B02C 19/0093* (2013.01); *B02C 19/186* (2013.01); *B02C 23/08* (2013.01); *B29B 17/0026* (2013.01); *B29B 17/0412* (2013.01); *E04F 15/02022* (2013.01); *E04F 15/02038* (2013.01); *E04F 15/102* (2013.01); *B01F 2035/99* (2022.01); *E01C 13/08* (2013.01)

(56) References Cited

U.S. PATENT DOCUMENTS

| | | | |
|---|---|---|---|
| 9,259,861 | B2 | 2/2016 | Mashburn |
| 9,347,227 | B2 | 5/2016 | Ramachandra et al. |
| 9,545,361 | B1 | 1/2017 | Brough |
| 9,803,385 | B2 | 10/2017 | Wagner |
| 2011/0179728 | A1 | 7/2011 | Cerny et al. |
| 2011/0252730 | A1 | 10/2011 | Rosan |
| 2012/0315816 | A1 | 12/2012 | Fowler et al. |
| 2013/0017023 | A1* | 1/2013 | Nicholls ................ B07B 15/00 406/39 |
| 2013/0064996 | A1 | 3/2013 | Mashburn |
| 2014/0312526 | A1* | 10/2014 | Kwak .................... B02C 23/08 264/328.17 |
| 2017/0232409 | A1 | 8/2017 | Brough |
| 2019/0040634 | A1 | 2/2019 | Meersseman et al. |
| 2020/0206980 | A1* | 7/2020 | Wilson .................... B07B 1/18 |

FOREIGN PATENT DOCUMENTS

| | | |
|---|---|---|
| EP | 2883712 A1 | 6/2015 |
| EP | 3604675 A1 | 2/2020 |
| JP | 2017-159598 A | 9/2017 |
| KR | 2013/0000873 A | 1/2013 |
| MX | 2019/004153 A | 10/2019 |
| PT | 3138677 T | 4/2020 |
| WO | WO-2011/081375 A2 | 7/2011 |
| WO | WO-2012/138216 A1 | 10/2012 |

OTHER PUBLICATIONS

Communication pursuant to Article 94(3) EPC dated Jul. 2, 2021 issued in related European patent application No. 20185342.1.
"Horizontal Vacuum Paddle Dryer / Reactor—HEINKEL Drying & Separation Group" Sep. 7, 2018, pp. 1-4, retrieved Jun. 28, 2021 at https://www.heinkel.com/product/horizontal-paddle-dryer-reactor/.
International Search Report and Written Opinion dated Jan. 3, 2022, issued in corresponding International Patent Application No. PCT/EP2021/068946.
Examination Report dated Aug. 31, 2023 issued in related Australian patent application No. 2021303487.
Office Action dated Oct. 31, 2023 issued in related Japanese patent application No. 2022-569569 with English translation.

* cited by examiner

SYSTEM AND METHOD FOR PROCESSING ARTIFICIAL TURF

CROSS-REFERENCE TO RELATED APPLICATIONS

This application is a national phase under 35 U.S.C. § 371 of PCT International Application No. PCT/EP2021/068946 which has an International filing date of Jul. 8, 2021, which claims priority to European Application No. 20185342.1 filed Jul. 10, 2020, the entire contents of each of which are hereby incorporated by reference.

FIELD OF THE INVENTION

Certain embodiments of the invention relate to the field of artificial turf. More specifically, certain embodiments of the invention relate to systems and methods for recycling artificial turf.

BACKGROUND OF THE INVENTION

Artificial turf carpets, and in particular third generation artificial turf carpets for ball sports such as soccer, rugby, and American football, are typically filled with sand or alternative mineral infill materials and a rubber elastic infill granulate. The sand or other mineral components (also referred to non-synthetic infill) are typically used to weigh down the installed turf carpet in a floating manner and to provide a dimensionally stable turf construction and shock damping effect in combination with the elastic infill material (also referred to as synthetic infill). The infill typically simulate the shock damping properties of natural turf, as well as providing a stable footing for players similar to natural turf. In particular, the rubber infill material provides good traction for a player's foot movement on the artificial turf surface, and hence mitigates the susceptibility of the player to injuries to joints, tendons, and ligaments. Moreover, the rubber infill may protect the players from severe skin burns.

Artificial turf carpets have a limited lifetime due to usage and exposure to the natural elements, such as exposure to UV radiation and temperature variations (e.g., extreme surface temperatures in summer and freezing conditions in winter). Over its lifetime, an artificial turf carpet loses its ability to provide adequate shock damping and/or adequate ball-roll across its surface due to exposure to mechanical stress, climatic changes, weathering (e.g., exposure to UV radiation and reactive components in the atmosphere such as ozone), and contact with chemicals such as quaternary ammonium salts or salts of hypo-chloric acid, used as antimicrobials for the disinfection treatment of turf surfaces. Artificial turf carpets have an expected lifetime of about of 10-15 years, after which the turf carpet and its infill material show signs of material fatigue due to constant mechanical stress and chemical/environmental impact. Furthermore, the fibers and infill may lose their color and may bleach.

In addition, polymers that form artificial turf carpets, such as polyethylene, polypropylene, polyamide, styrene butadiene copolymers or styrene-ethylenebutadiene-styrene block copolymers may partially decompose and lose their mechanical function, such as tensile strength and resilience, which makes refurbishing an expired artificial turf carpet for continued sport use too costly and time consuming.

Patent application No. EP20180186327 ("Artificial Turf Fibres Comprising Polymer Waste and A Compensatory Polymer," assigned to SportGroup-Polytex) describes a method of how to compensate for a loss of physical properties of an artificial turf carpet after a first product life by using a compensatory polymer and adaption of the UV stabilization package. Patent application No. MX2019004153 ("Method for Recycling Polyolefin Containing Waste," assigned to Fraunhofer Ges. Forschung) discloses a method for rejuvenating polymers via a solvolysis process, followed by partial precipitation and liquid filtration. However, both methods require a high separation of components of the turf construction in the field prior to beginning the recycling process. That is, both methods teach that polymer material from the fibers must be essentially free of infill, such as mineral components like sand, and free of other polymers from the primary and secondary backing, as well as moisture and debris.

Patent publication No. PT3138677 ("Process for Separating a Synthetic Turf Product," assigned to Re-Match (UK) Ltd) discloses a process that combines the separation of a dry synthetic turf in three defined consecutive steps of downsizing, air classification and sieving. However, achieving a sufficient separation quality for further use of the separated factions as recycled artificial turf components is difficult, given, for example, that PE fiber fragments and PP woven backing fragments have a similar material density and thus are difficult to separate even with a plurality of sets of sieves and air classifiers. In general, the gained cuts of fibers, or in case of solvolysis, the gained polymer precipitate, are agglomerated and/or granulated to enable the addition of the polymer mass to a fiber extrusion process. However, the high level of separation needed, and the accompanying processes of agglomeration and/or granulation requiring high energy consumption, limit the possibility of recycling the expired artificial turf carpet for a similar use.

Industry has also been looking at other possibilities of reusing fiber polymer material of artificial turf carpets after a first lifespan, which go beyond the primary use as components of a new artificial turf carpet. Patent application No. WO2012138216A1 ("Method of Forming a Substrate for a Sports Surface of a Sports Pitch, Such a Substrate as well as a Sports Pitch Provided with such Substrate," assigned to Ten Cate Thiolon B.V.) discloses the use of the fiber material to generate an agglomerate from fiber beats, and granulate the agglomerate to form granules which are used in elastic sub-constructions like insitu build elastic layers. These elastic layers have the function of a water permeable shock damping layer allowing the drainage of a field. However, the granules typically comprise polyethylene, polypropylene and/or polyamide which are not elastic and therefore do not contribute to the shock absorption of the subconstruction. To achieve shock damping, a mixture of these granules with, e.g., styrene-butadiene or natural-butadiene rubber recycling granules from passenger car and/or truck tires, can be used. The use of the non-elastic polymer granules is similar to the use of gravel in polyurethane-rubber mixtures. However, the production of these granules via an agglomeration and granulation process is an expensive and energy intensive process, and moreover, the used of (sophisticated twin screw) extrusion lines demands a high separation of the PE, PP and PU and/or styrene-butadiene latex backing. In particular, the separated factions must be essentially free of silica sand, which otherwise would abrade the expensive extrusion tools. The resulting processing costs for an inelastic granulate is comparable to costs for ubiquitously available gravel, and thus lacks economic viability.

What is needed is a system and method for processing artificial turf that does not require a high degree of separation of a turf composite having various thermoplastic polymer components such as PE, PP and PA (that have different melting points) and various thermoset polymer components such as sulfur crosslinked EPOM, and in particular does not require a high degree of separation of hard mineral components (e.g., components having a Moh's hardness ≥7, such as silica sand), which are otherwise abrasive to processing equipment.

BRIEF SUMMARY OF THE INVENTION

Various embodiments provide a system and method for artificial turf processing as described by the subject matter of the independent claims. Advantageous embodiments are described in the dependent claims. Embodiments of the present invention can be freely combined with each other if they are not mutually exclusive.

In one aspect, the invention relates to a method for processing an artificial turf, including providing an artificial turf having an artificial turf infill, separating at least a portion of the infill from the artificial turf, downsizing the artificial turf into artificial turf fragments, and rotationally mixing and transporting the artificial turf fragments at a pressure less than a maximum predefined pressure to form a melt. In one embodiment, the maximum predefined pressure is between about 0.08 bar to about 20 bar. The artificial turf infill may include mineral infill, such as sand, and/or performance infill, such as an elastomeric infill, and/or natural fiber infill. In another aspect, the artificial turf may not include any infill.

In another aspect, the invention relates to a melt system for processing an artificial turf. The melt system includes a chamber having a chamber wall, a proximate end and a distal end, where the chamber is configured to be heated to a predefined temperature, where the proximate end has at least one input port configured for receiving fragments of an artificial turf. The artificial turf fragments being processed in the chamber include up to 85 wt. % of infill, and the distal end has at least one output port. The melt system may further includes a mixing unit configured to rotationally mix and translationally move the artificial turf fragments from the proximate end toward the distal end for forming a melt in the chamber during which the pressure in the chamber is less than a maximum predefined pressure. The maximum predefined pressure is between about 0.08 bar to about 20 bar. In one aspect, the artificial turf fragments, or as described further below, artificial turf fragments that have been pre-mixed and then received as a pre-mixed material (also referred to as a mixed material) by the chamber through the one or more input ports, are heated and moved through the chamber for forming a melt before reaching the one or more output ports at the distal end. In another aspect, the at least one output port is configured for passing the melt, or in other words, the melt may flow through the output port(s).

In another aspect, the invention relates to a mold-cast product formed by the herein disclosed method for processing an artificial turf, including the steps of providing an artificial turf having an artificial turf infill, separating at least a portion of the infill from the artificial turf, downsizing the artificial turf into artificial turf fragments, and rotationally mixing and transporting the artificial turf fragments at a pressure less than a maximum predefined pressure to form a melt, where the maximum predefined pressure is between about 0.08 bar to about 20 bar. The melt may then be directed to fill one or more molds for providing one or more mold-cast products. The artificial turf infill may include mineral infill, such as sand, and/or performance infill, such as an elastomeric infill, and/or natural fiber infill. In another aspect, the artificial turf may not include any infill.

BRIEF DESCRIPTION OF SEVERAL VIEWS OF THE DRAWINGS

The following embodiments of the invention are explained in greater detail, by way of example only, making reference to the drawings in which.

DETAILED DESCRIPTION OF THE INVENTION

Figure 1:
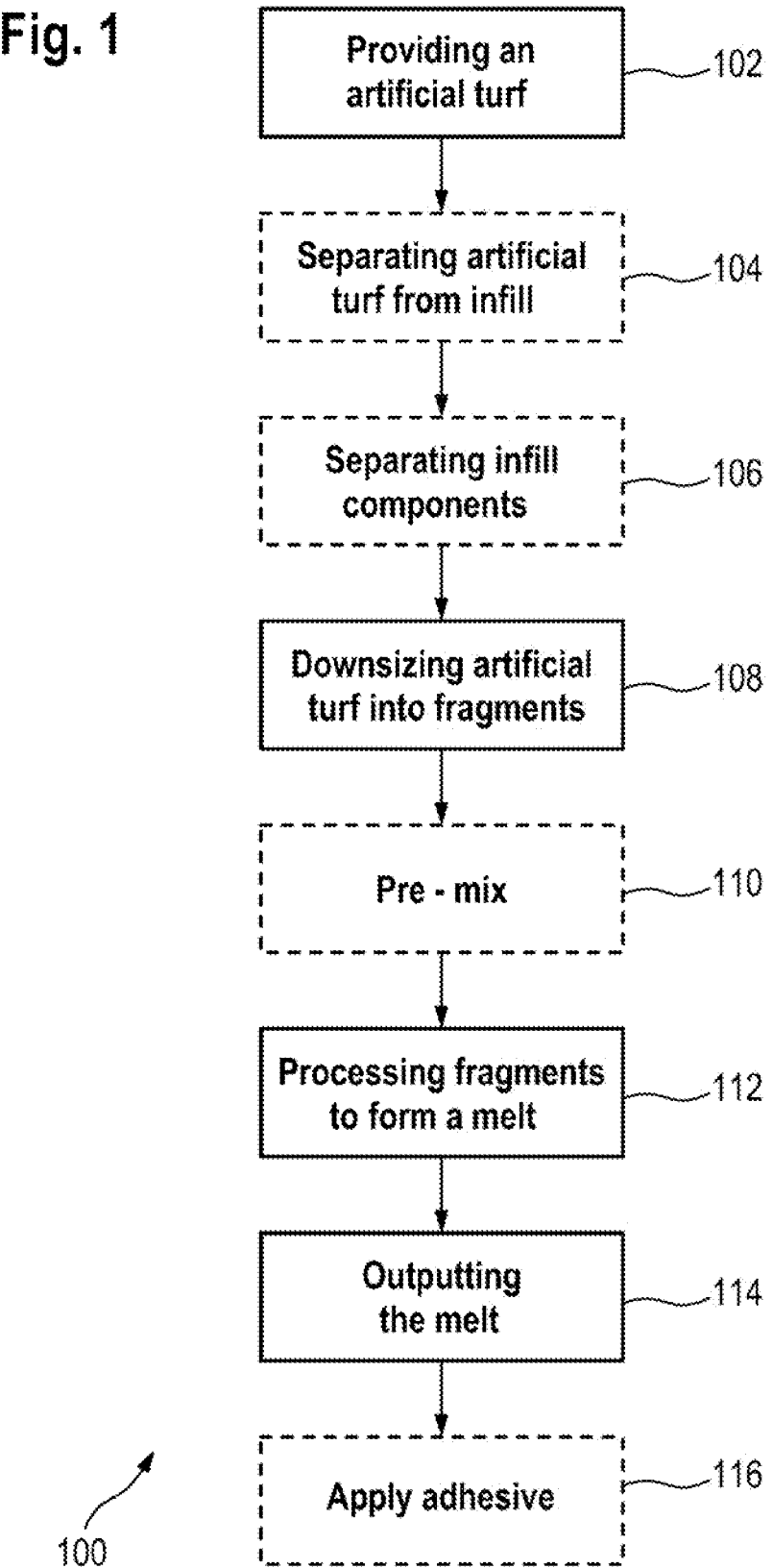
FIG. 1 Illustrates a method for processing an artificial turf, according to an embodiment of the present disclosure.

The descriptions of the various embodiments of the present invention have been presented for purposes of illustration and are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

According to an embodiment of the present disclosure, a method for processing an artificial turf includes providing an artificial turf having an artificial turf infill, separating at least a portion of the infill from the artificial turf, downsizing the artificial turf into artificial turf fragments, and rotationally mixing and transporting the artificial turf fragments at a pressure less than a maximum predefined pressure to form a melt. In one embodiment, the maximum predefined pressure is between about 0.08-20 bar. These features may have the advantages of forming a melt of artificial turf fragments by processing artificial turf fragments that have a large proportion of infill, such as mineral and elastomeric infill, and in particular, a large weight percentage of mineral infill, such as sand (e.g., silica sand), a large weight percentage of a performance infill, such as an elastomeric infill, a large weight percentage of a combination of mineral infill and performance infill, or a large weight percentage of a combination of mineral infill, performance infill and natural fiber infill, such as burlap fibers, jute fibers, cotton fibers, wool fibers, hemp fibers, flax fibers, kenaf fibers, nettle fibers, sisal fibers, coconut fibers, walnut fibers and combinations thereof, while preventing an increase of abrasion to components of a system that mixes the fragments, as well as reducing processing time and/or cost associated with preparing artificial turf fragments that have very little mineral infill. For example, according to one embodiment, the artificial turf fragments include up to about 85 wt. % infill, such as up to 85 wt. % mineral infill, up to 85 wt. % performance infill, such as elastomeric infill, up to 85 wt. % mineral and performance infill or up to 85 wt. % mineral infill, performance infill and natural fiber infill.

However, in another embodiment, the artificial turf may not include any infill.

In one embodiment, the artificial turf fragments are pre-mixed with the separated infill for forming a mixed material including up to 85 wt. % of the Infill. In another embodiment, the artificial turf fragments are pre-mixed with the mineral and/or the elastomeric components of the infill separated from the artificial turf, or with infill or infill components provide from other sources. In one embodiment, rotationally mixing and transporting the artificial turf fragments comprises rotationally mixing and transporting the mixed material.

In one embodiment, the mineral infill is separated from the elastomeric infill. This feature may have the advantage of reusing the mineral infill and/or elastomeric infill by adding the mineral infill and/or elastomeric infill to the turf fragments or the material mixture for reducing adhesion of the material mixture, which is composed of the fragments being rotationally mixed and transported, from surfaces of a melt system, assisting material flow through the melt system, providing flame retardant properties and/or providing specific physical properties to cast-molded products produced from the melt, such as appearance, specific haptic features, product thickness dimensions, static/dynamic frictional properties, strength, elongation, shrink, etc.

In one embodiment, a minimum of 60 wt. % of the infill is separated from the artificial turf. This feature may have the advantage of reducing processing time, reducing generation of excessive dust and other contaminants during separation processes, reducing wear on conventional separation machinery, and reducing cost.

In one embodiment, the artificial turf fragments have an average size of about 0.1 cm-25 cm, preferably about 0.5 cm-5 cm. These features may have the advantage of using unconventionally larger turf fragments due to the use of lower pressures in melt processes as compared to pressures used in conventional extrusion processes.

In one embodiment, the artificial turf fragments are rotationally mixed and transported at a predefined temperature. Advantageously, the predefined temperature may be based upon one or more melt temperatures of one or more thermoplastic components of the artificial turf fragments, which may be determined by either a visual inspection of the artificial turf or by accessing an artificial turf composition database that includes predefined temperatures (or temperature ranges) based upon composition, thereby streamlining the mix/melt process and ensuring that all thermoplastic components are melted.

In one embodiment, rotationally mixing and transporting the artificial turf fragments includes rotationally mixing and transporting the artificial turf fragments in a chamber. The chamber has a proximate end, a distal end, at least one input port positioned at the proximate end for receiving the artificial turf fragments, and at least one output port positioned at the distal end through which the melt flows. The transporting further includes translationally transporting the artificial turf fragments toward the distal end of the chamber. In another embodiment in which a pre-mixed artificial turf material (i.e., turf fragments pre-mixed with infill) is introduced into the chamber via the input port(s), the rotationally mixing and translationally transporting further includes rotationally mixing and translationally transporting the mixed material (also referred to as material mixture) toward the distal end of the chamber. These features may have the advantage of transporting (i.e., providing translational motion to) the fragments or material mixture, while being mixed in a rotational sense, from the proximate end toward the distal end, thereby using the mixing process to both rotationally mix and translationally move the mixture toward the output, during which a melt is formed from the fragments or the material mixture.

In one embodiment, the pressure in the chamber is less than or equal to the maximum predefined pressure, where the pressure in the chamber is created by the forward translational motion of the fragments or the material mixture within the chamber. The pressure in the chamber may also depend upon the dimension of the chamber output port, and other characteristics of the chamber, such as configuration of the mixing/translational unit (also referred to as the mixing unit) of the chamber, including number of paddles, paddle shape, orientation of the paddles in the chamber, distance between paddles and the chamber wall, etc. Elements of the mixing unit will be discussed further below in conjunction with the melt system. In another embodiment, the maximum predefined pressure is less than 20 bars, preferably 0.02-20 bars, more preferably less than 10 bars, and even more preferably less than 8 bars. These features may have the advantage of forming a melt of artificial turf fragments by processing artificial turf fragments that have an increasing larger proportion of infill, such as mineral and elastomeric infill, and in particular, an increasing larger weight percentage of mineral infill, such as sand (e.g., silica sand) and/or performance infill and/or natural fiber infill, while preventing an increase of abrasion to components of a system that rotationally mixes and translates the fragments or material mixture, as well as reducing processing time and/or cost associated with preparing artificial turf fragments that have very little mineral infill. Furthermore, the features may have the advantage of reducing the cost, complexity, and maintenance of a melt system by eliminating the larger pressures required for conventional extrusion processes.

In one embodiment, at least one additive is added to the artificial turf fragments. In another embodiment, at least one additive is added to the material mixture. In another embodiment, the additive includes at least one of: one or more pigments, one or more added polymers, one or more flame retardants and a measured amount of a mineral. These features may have the advantage of assisting the melt processing by reducing or eliminating adhesion of the fragments or material mixture to surfaces of the processing system that come into contact with the fragments or mixture and/or facilitating the flow of the fragments or material mixture through the melt system from input to output and/or providing a product produced from the melt (e.g., a cast-mold product) that has specifically designed physical properties or characteristics, such as color and degree of abrasiveness, UV stability, among others.

In one embodiment, the melt is directed or placed Into one or more molds for providing a mold-cast product. These features may have the advantage of providing non-extruded molded products via a more cost effective process, as well as having the advantage of specifically processing the artificial turf fragments or material mixture with abrasive mineral additives for generating a product having specifically designed physical properties and characteristics suitable for a particular use.

According to an embodiment of the present disclosure, a melt system for processing an artificial turf is provided. The melt system includes a chamber having a proximate end and a distal end, where the chamber is configured to be heated to a predefined temperature, where the proximate end has at least one input port configured for receiving fragments of an artificial turf, where the artificial turf fragments being processed in the chamber include up to about 85 wt. % of infill, such as mineral and/or performance infill, and where the distal end has at least one output port. The melt system may further include a mixing unit configured to rotationally mix and translationally transport the artificial turf fragments from the proximate end toward the distal end for forming a melt in the chamber during which the pressure in the chamber is less than a maximum predefined pressure. The maximum predefined pressure is between about 0.08-20 bar. The output port(s) is configured for passing the melt. These features may have the advantage of forming a melt of artificial turf fragments by processing artificial turf fragments that have a large proportion of infill, such as mineral and elastomeric infill, and in particular, a large weight percentage of mineral infill, such as sand (e.g., silica sand) and/or performance infill and/or natural fiber infill, while preventing an increase of abrasion to components of the melt system, as well as reducing processing time and/or cost associated with preparing artificial turf fragments that have very little mineral infill. For example, according to one embodiment, the artificial turf fragments being processed in the chamber Include up to about 85 wt. % of infill, such as mineral and/or performance and/or natural fiber infill.

In one embodiment, the mixing unit includes one or more paddles, each paddle mechanically coupled to a rotatable longitudinal portion via a connecting portion. The one or more paddles are configured to rotationally mix and translationally transport the fragments or the material mixture toward the distal end of the chamber when the rotatable longitudinal portion is rotated. The chamber includes a chamber wall and at least one heating unit, where the at least one heating unit has one or more heating elements positioned on an outside surface of the chamber wall. The system further includes a power source mechanically coupled to the rotatable longitudinal portion, the power source configured to rotate the longitudinal portion, and a control unit electrically coupled to the power source and the heating unit of the chamber. Although each heating unit may include one or more heating elements arranged on an outside surface of the chamber, alternatively or in addition, each heating unit may include one or more heating elements arranged within the chamber wall. The control unit includes a processing unit or alternatively is coupled to an external processing unit of, for example, an external computer or computing system. The control unit may optionally include a memory including a database and an input/output user interface, and the control unit is configured to access the database and receive user input for determining a rotational speed of the longitudinal portion of the mixing unit and a predefined temperature of the chamber. The control unit is also configured to control the power source and the heating element to achieve the rotational speed of the longitudinal portion of the mixing unit and the predefined temperature of the chamber. These features have the advantage of automating control of the processing chamber and automating determination of processing parameters of the chamber.

According to an embodiment of the present disclosure, a mold-cast product is formed by the herein-disclosed method for processing an artificial turf, including the steps of providing an artificial turf having an artificial turf infill, separating at least a portion of the infill from the artificial turf, downsizing the artificial turf into artificial turf fragments, and rotationally mixing and transporting the artificial turf fragments at a pressure less than a maximum predefined pressure to form a melt, wherein the maximum predefined pressure is between about 0.08-20 bar. The melt may then be directed to fill one or more molds for providing one or more mold-cast products.

According to several embodiments of the present disclosure, the mold-cast product includes floor panels. Embodiments of the floor panels includes floor panels with one or more side surfaces configured to receive an adhesive for attaching each of the one or more side surfaces to respective one or more side surfaces of one or more adjacent floor panels for connecting (i.e., securing) the floor panel to the one or more adjacent floor panels, and floor panels having one or more side surfaces in which at least a portion of each side surface of the one or more side surfaces includes one or more of a recess, a projection and a flange for connecting the floor panel to one or more adjacent floor panels, and floor panels having side surfaces including any combination of one or more of adhesive, flanges, projections and recesses for connecting the floor panels securely and/or removably with one another.

These features may have the advantages of providing mold-cast products efficiently, cost-effectively, and which have specifically designed physical properties and characteristics attributable, at least in part, to the amount of mineral content present during the processing. The mold-cast products include, but are not limited to, floor panels, components for shock damping of children playgrounds or path construction positioned around, for example, artificial turf playing fields, or components for paths used for other outdoor activities, such as horse-riding paths or bicycle paths, or walls, such as walls used in athletic facilities.

FIG. 1 Illustrates a method 100 for processing an artificial turf, according to an embodiment of the present disclosure. In step 102, an artificial turf is provided. In one embodiment, the artificial turf includes an infill material including a non-synthetic (i.e., natural) infill, such as a sand infill (e.g., silica sand) or other mineral infills, such as zeolite, and/or a performance infill, such as an elastomeric infill (e.g., rubber or any polymer infill), and combinations thereof. Performance infills are those infills that may aid or contribute to the performance of activities being performed on the artificial turf, and also may mitigate the severity of injuries and/or greatly reduce the risk of injury. For example, performance infills may have cushioning effects, mitigate against skin injuries caused by sliding on the turf, and/or aid in traction. Other infill material may include natural fibers, such as burlap fibers, jute fibers, cotton fibers, wool fibers, hemp fibers, flax fibers, kenaf fibers, nettle fibers, sisal fibers, coconut fibers, walnut fibers and combinations thereof.

In one embodiment, the artificial turf is provided from a site at which the artificial turf had previously been Installed (i.e., an Installation site). Artificial turfs typically have a limited lifetime, dependent upon type of usage, environmental conditions, and/or composition of the artificial turf. Once an artificial turf has exceeded its lifetime, components of the artificial turf can either be recycled for use as components of a new artificial turf or can be recycled to provide different products or products to be used in conjunction with artificial turfs. According to one embodiment, an artificial turf is provided from an installation site by cutting the artificial turf at the installation site into strips, rolling the strips into cylindrically-shaped bundles or other shaped configurations that may optimize storage space and transportation, and transporting the strips to a turf processing site. The advantages of providing the artificial turf strips from an installation site to a turf processing site is the reduction of dust and other contaminants created at the turf processing site, as well as a reduction in turf processing time as a result of cutting the turf on-site into manageable and transportable smaller portions. In another embodiment, the entire artificial turf is removed from the installation site and transported to the processing site for further processing. In yet another embodiment, the artificial turf is provided by receiving the artificial turf or artificial turf portions at the processing site.

In optional step 104, the artificial turf infill is separated from the artificial turf. Although in a preferred embodiment the separation is performed at the artificial turf processing site, the scope of the present disclosure covers separating the infill from the artificial turf on-site, thereby reducing the weight of the artificial turf for transport and reducing the amount of dust and contaminants created by the separation process at the processing site.

According to embodiments of the present disclosure, vacuum cleaners and/or mechanical beating and/or vibration devices known in the art are used to separate at least a portion of the infill from the artificial turf. Techniques and machines for separating infill from artificial turf are well known in the art and will not be discussed in further detail.

According to one embodiment of the present disclosure, up to 40 weight (wt.) % infill may remain in the artificial turf after separation of the infill from the artificial turf, and in a preferred embodiment, 10-20 wt. % of infill may remain in the artificial turf, and in an even more preferred embodiment, 1-15 wt. % of infill may remain in the artificial turf, however, the scope of the present disclosure covers more or less infill remaining in the artificial turf after separation. For example, in other embodiments, 40 wt. % or greater of the infill may remain in the artificial turf after separation of the infill from the artificial turf.

In optional step 106, the separated infill is further separated into one or more of respective infill components. For example, the separated infill is processed by separating the non-synthetic sand infill and/or other mineral infill from one or more of the performance infills and/or natural fiber infills. In one embodiment, either a series of sieves or a wet flotation separation process, or both sieves and a wet flotation separation process, performed sequentially, is used to separate sand infill from elastomeric infill, such as rubber granulate infill. According to one embodiment of the present disclosure, the infill separated in step 104 is further separated into at least a first component of sand having average particulate dimensions of about 0.2-1.0 mm and a second component of elastomeric infill having average particulate dimensions of about 0.5-2.5 mm. The first and/or second infill components may be used later in the processing method 100 as described further below, or may be used as components in other products, such as cement, for example. Wet flotation separation processes for separating particulate having different densities are well known in the art and will not be discussed here in further detail.

In step 108, the artificial turf is crushed and/or shredded (i.e., downsized) into artificial turf fragments. In one embodiment, shredders, granulators, cutting mills, chippers, high pressure crushers and/or other types of crushing/shredding industrial machinery used to reduce the size of material may be used to reduce the artificial turf into artificial turf fragments. In one embodiment, the artificial turf fragments have an average size in a range of about 0.1 cm-25 cm. In a preferred embodiment, the artificial turf fragments have an average size in a range of about 0.5 cm-5 cm. However, the scope of the present disclosure covers fragments having average sizes greater than 25 cm and/or smaller than 0.1 cm. In a further embodiment, the size distribution may be a Gaussian distribution around any average size value within the preferred range, however the scope of the present disclosure covers any non-gaussian size distribution of the fragments within the preferred range. The artificial turf fragments may include synthetic and non-synthetic components, such as one or more of sand, performance infill, fibers, backing material, adhesives, pigments, and combinations thereof. In a preferred embodiment, the artificial turf fragments include about 10-20 wt. % of non-synthetic infill, performance infill, or a combination of both, and in even more preferred embodiment, about 1-15 wt. % of infill. However, the scope of the present disclosure covers artificial turf fragments having greater than 20 wt. % of infill.

In optional step 110, the artificial turf fragments are processed, by a primary mixer, to form pre-mixed artificial turf material, also referred to herein as mixed material or material mixture. Primary mixers Include conventional industrial mixers for mixing shredded and/or crushed products, such as downsized artificial turfs or other synthetic and/or non-synthetic fabrics. Primary mixers are well known in the art and will not be discussed in further detail.

In one embodiment, a predetermined amount of mineral, such as sand, is added to the primary mixer along with the artificial turf fragments for forming the material mixture. The predetermined amount of sand depends upon the amount of sand selected to be in the final molded product and upon the amount of residual mineral infill remaining in the artificial turf fragments. In another embodiment, an amount of mineral is added such that the mineral content in the material mixture is up to 85 wt. % of the material mixture, and in a preferred embodiment, between 20-85 wt. %. For example, a mineral, such as sand, may be added to the primary mixer such the amount of sand is any one of 20-30 wt. %, 30-40 wt. %, 40-50 wt. %, 50-60 wt. %, 60-70 wt. %, 70-80 wt. % or 80-85 wt. % of the material mixture.

In another embodiment, one or more additives are added to the primary mixer along with the artificial turf fragments for forming the material mixture. A described in more detail below in conjunction with step 112, the additives may include one or more dyes or pigments for coloring the material mixture, one or more polymers that assist flow of the material mixture in the chamber and prevent adherence of the material mixture to surfaces of the melt system, flame retardants and/or a predetermined amount of mineral, such as sand, and combinations thereof.

In step 112, the artificial turf fragments, or optionally the pre-mixed artificial turf material (i.e., the material mixture), are processed to form a melt. The artificial turf fragments (or optionally the mixed material) being processed in the chamber may include up to about 85 wt. % of mineral and/or performance infill. In one embodiment, the artificial turf fragments (or optionally the mixed material) are rotationally mixed and translationally transported at a predefined temperature and a predefined pressure less than or equal to a maximum pressure to form the melt. According to an embodiment of the present disclosure, and as discussed further below in conjunction with FIG. 2, an artificial turf melt system is used for further processing the artificial turf fragments (or optionally the mixed material).

As discussed further below in conjunction with FIG. 2, the melt system includes a processing chamber having at least one input port for receiving the artificial turf fragments or the mixed material and at least one output port through which the melt flows. The melt system further includes a mixing unit for rotationally mixing the material and translationally transporting the material from the input port to the output port, one or more heating units for heating the material in the chamber to a predefined temperature, and an optional control unit for controlling the processing chamber.

In one embodiment, the predefined temperature (or a predefined temperature range) is selected by an operator of the system or determined by the control unit based upon data input to the control unit by the operator. The predefined temperature is a temperature that exceeds the melt temperatures of the thermoplastic components of the artificial turf fragments. Thermoplastic components include, for example, polyethylene (PE), polypropylene (PP) and polyamide (PA). The artificial turf fragments may also include thermoset components, such as polyurethane (PU) and latex that have strong cross-linking of polymers that resist melting, as well as sand or other mineral infill which will not melt under the temperature/pressure conditions of the present disclosure. For example, in one embodiment, the predefined temperature range is between about 100 and 400° C., however in a preferred embodiment, the temperature of the material in the processing chamber is between about 110 and 240° C., in a more preferred embodiment between 110 and 210° C., and in an even more preferred embodiment between 110 and 190° C. In one embodiment, a maximum temperature of the predefined temperature range is selected, for example, by an operator of the melt system, that is less than the melt temperature of the infill component having the lowest melt temperature of all the infill components that are present in the artificial turf fragments or material mixture. In another embodiment, the maximum temperature of the predefined temperature range is selected that is less than the ignition temperature of the infill component having the lowest ignition temperature of all the infill components that are present in the artificial turf fragments or material mixture. As will be described further below in conjunction with FIG. 2, the system may have a database (or access to a database) from which the predefined temperature is determined based upon data input to the system by the operator, such as composition of the artificial turf.

In another embodiment, the predefined maximum pressure of the processing chamber (or a predefined maximum pressure range of the processing chamber) is selected by an operator of the system or determined by the control unit based upon data input to the control unit by the operator. In one embodiment, the predefined maximum pressure range is below about 20 bar, between about 0.8-20 bar in a preferred embodiment, less than about 10 bars in a more preferred embodiment, and less than about 8 bars in an even more preferred embodiment. Operating the processing chamber at these pressures allows for processing material in the chamber having up to 85 wt. % of hard, abrasive components (i.e., a Moh's hardness greater than about 6), such as silica sand infill, without any damage or excessive wear to the components of the melt system. As will be described further below in conjunction with FIG. 2, the system may have a database (or access to a database) from which the maximum pressure (or maximum pressure range) is determined based upon data input to the system by the operator, such as composition of the artificial turf.

Furthermore, step 112 may optionally include adding one or more additives to the chamber either with the turf fragments (or the mixed material) via the input ports or sometime after the turf fragments (or the mixed material) have been introduced into the chamber and rotationally mixed and/or translationally moved forward from the input port in the direction of the output port. For example, the additives may include one or more dyes or pigments for coloring the material, one or more polymers that assist material flow in the chamber and prevent adherence of the material mixture to surfaces of the melt system, flame retardants, and/or a measured amount of a mineral material, such as a measured amount of the sand infill component and/or the performance infill that was separated from the artificial turf in steps 104-106.

In one embodiment of the present disclosure, a pigment such as Fe2O3-red or Cr2O3-green could be added to the processing chamber for changing the color of the mixture to give a product produced by the melt a desired color. According to an embodiment, a pigment addition would range between 0.2-1.5 wt. % of the material mixture. Furthermore, pigments could be added in the form of a color masterbatch, which additionally could include a UV stabilizer like a Hindered Amine Light Stabilizer (HALS) and/or a phenolic UV absorber and/or an antioxidant and/or an oxygen scavenger to protect the final product from weathering by UV light and oxidative processes. Other additives for improving haptics, appearance, and/or performance of the material and resultant products of the material, for example, could be also added.

In another embodiment of the present disclosure, one or more polymers, for example production waste from fiber extrusion (fiber cuts) of artificial turf which typically contains polyethylene with a Melt Flow Index of 0.8-5.0 (e.g., 2.16 kg per 10 minutes at 190° C.), may be added to assist the rotational and/or translational flow of the material mixture or turf fragments In the processing chamber, as well as assist with increasing the homogeneity of the mineral material (e.g., sand) in the material mixture of turf fragments. Other polymers that may be added include waste plastics and aged plastics, such as plastics recovered from the ocean (i.e., ocean plastics) or landfills.

In one embodiment, fluorinated polymers may be added to the material mixture or turf fragments to prevent or decrease the adhesion of the material mixture to component surfaces of the melt system, such as surfaces of the chamber walls, input/output ports, and mixing unit. Any adhesion of the material mixture to component surfaces of the melt system increases the risk that polymer components of the material mixture will undergo thermal deterioration via a high temperature baking process, resulting in inferior products. In one embodiment, a fluorinated polymer, such as polytetrafluoroethylene (PTFE), is added In the amount of about 0.01-0.06 wt. % of the material mixture. However, since mineral components in the material mixture, such as sand, deter baking of the polymers in the processing chamber, and since embodiments of the material mixture include unconventionally high mineral content (e.g., up to 85 wt. %), the amount of fluorinated polymers may be in the lower range of 0.01-0.06 wt. %, and even lower than 0.01 wt. %. In one embodiment, fluorinated polymers are not added to the material mixture.

As an alternative to fluorinated polymers, and according to another embodiment of the present disclosure, non-fluorinated substances, such as silicone polymers, polyethylene glycol, or viscoelastic substances, such as a silanol or polyol cured by a borate, or a combination thereof, may be added to the material mixture to prevent or decrease the adhesion of the material mixture to component surfaces of the melt system, such as surfaces of the chamber walls, input/output ports, and mixing unit. Use of non-fluorinated additives may result in less toxic waste products being emitted from processing the artificial turf fragments by the melt system.

Turf material components, with the exception of silica sand, are in general flammable. Thus, according to one embodiment of the present disclosure, a flame retardant additive, such as Aluminum-Tri-Hydroxide (ATH), $MgCl_2$ or Ammonium polyphosphate, may be added in the proportion of about 5-60 wt. % of the material mixture. However, since mineral components in the material mixture, such as sand, have a flame retarding effect, and since embodiments of the material mixture include unconventionally high mineral content (e.g., up to 85 wt. %), the amount of flame retardant additive may by in the lower range of 5-60 wt. %, or lower than 5 wt. %, or not added at all to the material mixture.

According to another embodiment, a measured amount of sand or other mineral material is added to the turf fragments such that a precise amount of mineral content of the material in the chamber is known and controlled. For example, if the final product created from the melt of the material in the chamber requires a specific amount of static and/or dynamic friction between the surface of the product and an external object, such as, for example, a ball, a person or machinery coming Into contact with the surface, and/or a specific action to result from such a contact with the external object, a measured amount of sand, other minerals and/or other hard and abrasive materials (natural or synthetic) may be added to the turf fragments in the chamber to create the desired properties of the final product. For example, mineral may be added to the chamber to create a material including the turf fragments and the mineral in which the mineral comprises up to 85 wt. % of the material, and in a preferred embodiment, between 20-85 wt. %. For example, a mineral, such as sand, may be added to the turf fragments in the chamber such the amount of sand is any one of 20-30 wt. %, 30-40 wt. %, 40-50 wt. %, 50-60 wt. %, 60-70 wt. %, 70-80 wt. % or 80-85 wt. % of the material in the chamber.

In step 114, the portion of the material (i.e. turf fragments mixed with mineral or the pre-mixed material mixture) that has been moved forward in the chamber from the input port to the output port, which is in the form of a melt before or upon reaching the output port, is output from the output port. In one embodiment of the present disclosure, the melt flows from the output port(s) in the form of one or more threads and may be directed to a molding process, including a filling of one or more molds. In another embodiment, the one or more threads can be cut into segments as the threads leave the output port(s) to create cylindric material pieces, which can be temporarily stored in a material buffer before being directed into the one or molds. The one or more threads can be cut into segments as the threads leave the output port(s), or the threads can be directed into a water bath and the threads cut into segments under water. The scope of the present disclosure is not limited to cutting the threads for forming cylindrical pieces but includes cutting and/or forming the melt flowing from the output port into any shape, size, or design.

After the melt in the mold has cooled and solidified, the solidified melt is removed from the mold, thereby providing a non-extruded mold-cast product. In one embodiment, the melt flows through the output port only under the force of the chamber pressure created by the motion of the mixing unit transporting the material mixture forward in the chamber in the direction from the input port to the output port, or in the case of e.g., a cylindrical chamber, transporting the material mixture in a longitudinal direction of the processing chamber, in contrast to well-known extrusion processes that force a melt under high pressure through a die for forming a die-cast product.

According to another embodiment of the molding process, the mold can be filled with the threads or substantially-shaped cylindric pieces while being temperature and/or pressure controlled. For example, after the mold has been filled with the threads or cylindrical pieces at approximately atmospheric pressure, a pressure at 20 to 300 bar can be applied to the mold. In another embodiment, talcum powder or known releasing agents are applied to the mold to coat the inner surfaces of the mold to assist In releasing the product from the mold upon solidification. However, since mineral components in the material mixture, such as sand, function as releasing agents, the present disclosure covers embodiments in which the mold is coated with little or no releasing agents.

In a further embodiment, an in-mold-coating (IMC) is used to achieve a different surface color, gloss and/or touch to the mold-cast product. The IMC can be achieved with a solvent-based or water-born PU system. For example, an IMC compound is applied to the inside surface(s) of the mold before the melt is placed into the mold. Upon cooling and hardening of the melt in the mold, the IMC may adhere to the outside surface(s) of the cast-molded product to give the product a glossy appearance, to reduce the abrasiveness of the outer surface of the product, and/or to facilitate the removal of the cooled and hardened melt from the mold.

In one embodiment, a fluoropolymer, such as polytetrafluoroethylene (PTFE) may be applied to the inner surface of the mold, either by spraying the PTFE or dipping the mold into a solution of PTFE. According to one embodiment, a mold coating compound may be formed of nickel 80-83 wt. %, phosphorus 9-11 wt. %, and PTFE 8-9 wt. %. However, the scope of the present disclosure covers other mold coating compounds that are not fluoropolymers, such as tungsten disulfide.

According to other embodiments of the present disclosure, the molded products may be used, for example, as a components for shock damping of children playgrounds or path construction positioned around, for example, artificial turf playing fields, or as paths used for other outdoor activities, such as horse-riding paths or bicycle paths, or as walls or component of walls for athletic facilities.

In one embodiment, the wall thickness of the molded product is dependent on the mineral content (e.g., sand content) of the melt. According to one embodiment, the molded products may have a minimum wall thickness of about 0.2 mm, and in a preferred embodiment, the wall thickness is greater than about 2 mm. For higher mineral contents, e.g., 95 wt. % of sand, the wall thickness can be about 10 mm or greater.

Figure 2:
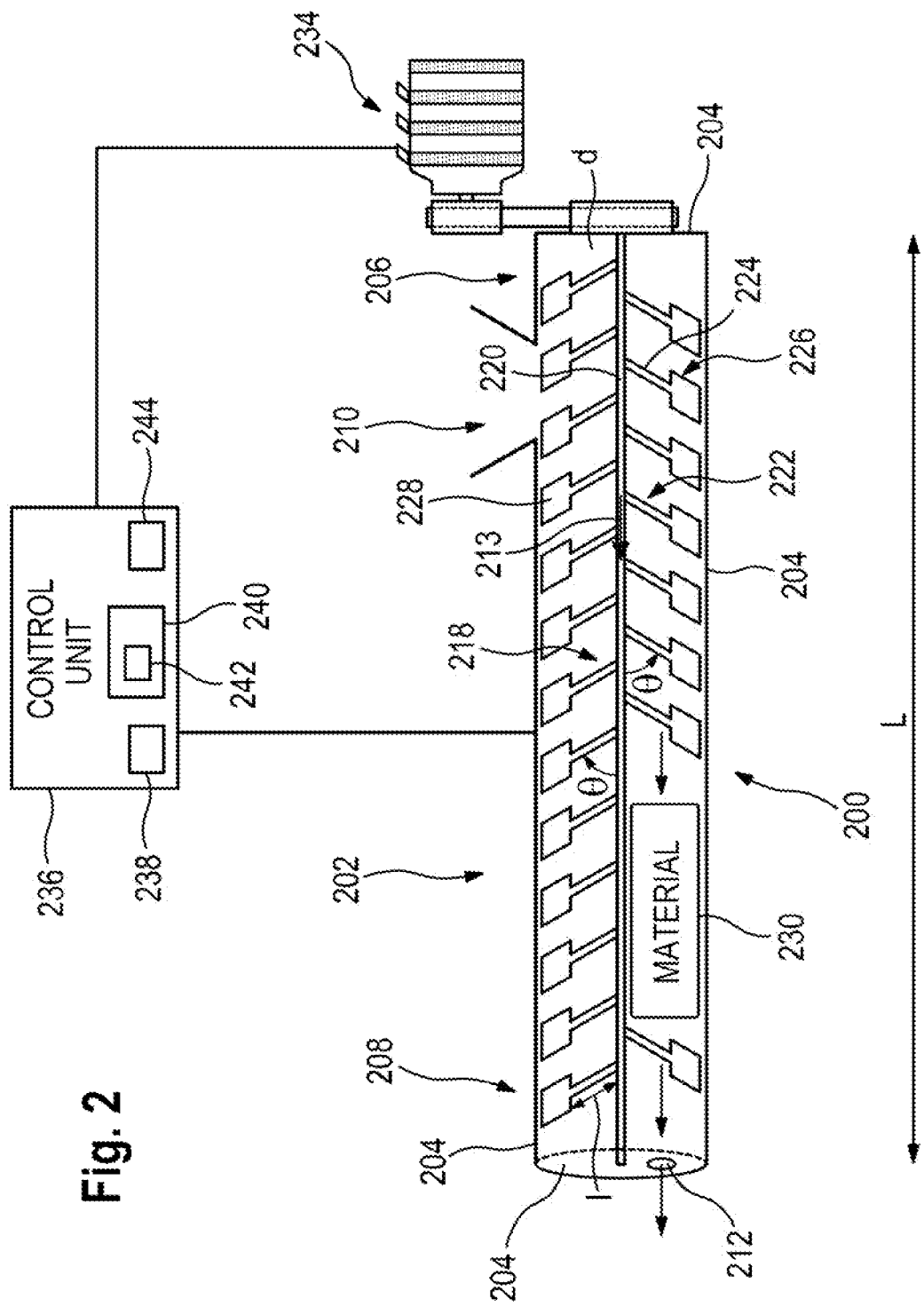
FIG. 2 is a schematic diagram of an artificial turf melt system for processing the artificial turf of FIG. 1, according to an embodiment of the present disclosure.

FIG. 2 is a schematic diagram of an artificial turf melt system 200, according to an embodiment of the present disclosure. The melt system 200 may be used to process the artificial turf fragments or the mixed material as described in conjunction with steps 112-114 of FIG. 1.

Figure 3:
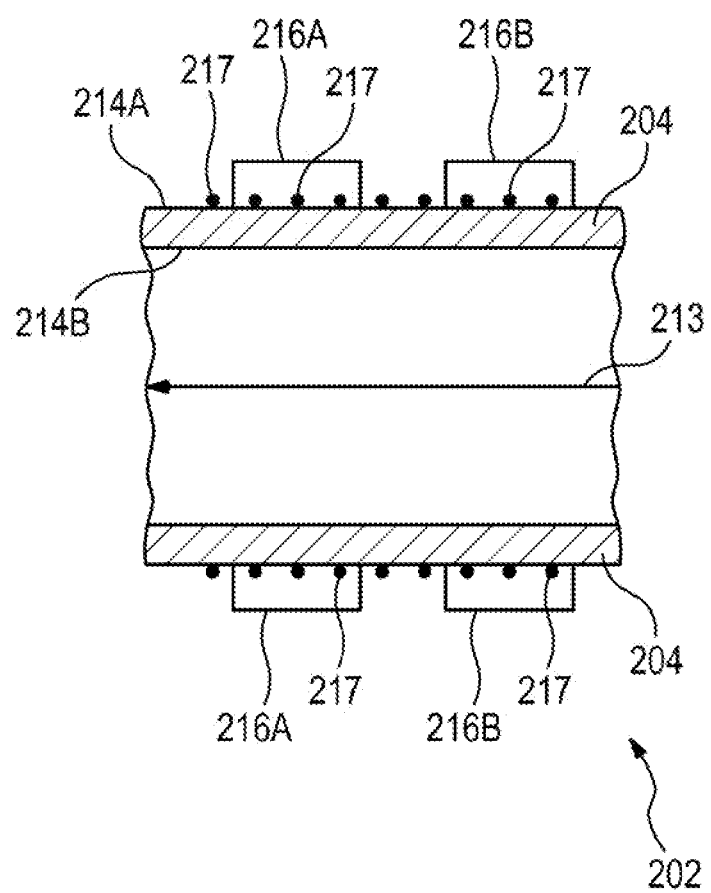
FIG. 3 is a schematic diagram of a longitudinal cross section of a portion of the chamber of FIG. 2, according to an embodiment of the present disclosure.

In one embodiment, the melt system 200 includes a chamber 202 having chamber walls 204, a proximate end 206 and a distal end 208. The melt system 200 includes one or more input ports 210 positioned at the proximate end 206 and one or more output ports 212 positioned at the distal end 208. As illustrated, the chamber 202 is cylindrical in shape, centered about a longitudinal axis 213, and has a longitudinal length L and a diameter d. The length l is greater than the diameter d. However, the scope of the present disclosure covers chambers 202 having other shapes, such as substantially rectangular or substantially elliptical chambers, for example. According to another embodiment, and as illustrated by FIG. 3 showing a longitudinal cross section of a portion of the chamber 202, the chamber walls 204 include an outside surface 214A, an inside surface 214B, and at least one heating unit 216 Including heating elements 217 in contact with the outside surface 214A of the chamber walls 204. For ease of Illustration, only two heating units 216A and 2168 are shown, however, the remaining heating elements 217 may be components of other heating units (not shown), and the heating units may include any number of heating elements. In one embodiment, the heating unit may include electronics, thermostats, controllers, power supplies, etc., and the heating elements may be conducting wires configured to circumferentially wrap around the outside surface 214A of the chamber 202. A heating unit and its corresponding heating elements may be housed in separate enclosures and electrically coupled together, or a heating unit may house it's corresponding heating elements. In another embodiment (not shown), at least a portion of the heating elements may be contained in the chamber walls between the outside surface and the inside surfaces 214A, 2148.

Referring again to FIG. 2, the melt system 200 also includes one or more mixing units 218. Each mixing unit 218 includes a rotatable longitudinal portion 220 and a plurality of mixers 222. As illustrated, each mixer of the plurality of mixers 222 includes a connector portion 224 connected to the longitudinal portion 220 and a mixing portion 226 connected to its respective connector portion 224. The connector portion 224 extends at an angle θ to the longitudinal axis 213 of the chamber 202. Although FIG. 2 illustrates only one mixing unit 218, the scope of the present disclosure covers two or more mixing units 218, each having a rotatable longitudinal portion. For example, each rotatable longitudinal portion (i.e., rotatable axis) may be positioned parallel, but not concurrent with the longitudinal axis 213 of the chamber 202, such that the plurality of mixers of each mixing unit do not physically Interfere with one another when the mixing units are being operated (i.e., rotated).

In one embodiment, the connector portion 224 forms the angle θ with the longitudinal axis 213, where $0 \leq \theta \leq 180$. In one embodiment, the angle 9 may be based upon a surface area of the mixing portion 226, a length l of the connector portion 224 and/or a general shape of a surface 228 of the mixing portion 226 (e.g., flat, concave, convex). According to one embodiment, values for 9, the surface area of the mixing portion 226, and/or the general shape of the surface 228 of the mixing portion 226 are determined such that material 230 in the chamber 202 is effectively rotationally mixed and translationally advanced (i.e., moved forward from the proximate end 206 of the chamber 202 to the distal end 208 of the chamber 202, or in other words, moved parallel to the longitudinal axis 213 of the chamber 202). For clarity, only a portion of the material 230 in the chamber 202 is illustrated. In one embodiment, material 230 may either be the material mixture or the turf fragments with an added mineral. In another embodiment, the material 230 may be a combination of turf fragments and the added mineral with the material mixture. The composition of the material 230 depends upon whether a material mixture, turf fragments and the added mineral, or a combination of both are fed into the melt system 200 via the one or more input ports 210. In addition, the material 230 may be in a semi-melt state, dependent upon where it is located in the chamber with respect to the proximate and distal ends 206, 208. Within the meaning of the present disclosure, the material in the chamber is effectively rotationally mixed and translationally advanced when after a few rotations (e.g., 1-5 rotations) of the longitudinal portion 220 about the longitudinal axis 213, any material 230 at a first position in the chamber 202 is moved to a second nearby position (not shown) in the chamber.

Figure 4:
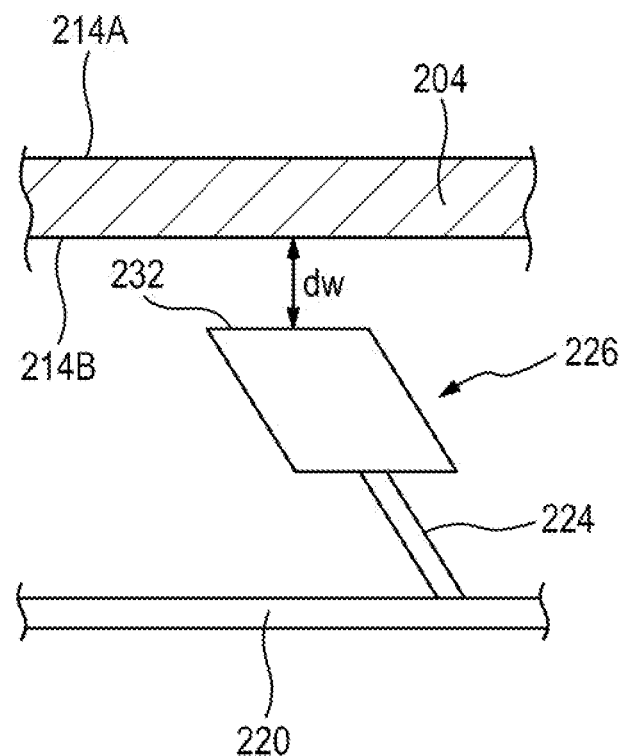
FIG. 4 is a schematic of a portion of the chamber of FIG. 2 illustrating the distance $d_w$ between an outer paddle edge and the inside surface of the chamber wall, according to an embodiment of the present disclosure.

In one embodiment of the present disclosure, one or more mixing portions 226 are configured as paddles. The paddles 226 may be elliptical, spherical, or polygonal shaped, for example, and may have smooth, ridged, or serrated surfaces 228. As illustrated by FIG. 4, a distance $d_w$ is the distance between an outer paddle edge 232 (i.e., the edge of a paddle that is closest to the inside surface 214B of chamber wall 204) and the inside surface 2148 of the chamber wall 204. The distance $d_w$ may depend upon one or more of: largest average sizes of the turf fragments or material mixture placed into the chamber 202, the throughput (i.e., rate of flow) of the material 230 in the chamber 202 parallel to the longitudinal axis 213, rotational speed of the paddles 226, and the average amount of weight percentage of sand or other abrasive infill present in the artificial turf fragments. The chamber pressure created by the rotational motion of the paddles 226 may depend not only upon the rotational (i.e., angular) speed of the paddles 226, but also upon the distance $d_w$. In one embodiment, $d_w$ is greater or equal to the average size of the artificial turf fragments or material mixture, and in another embodiment, is equal to the size of the largest or near largest artificial turf fragment or material mixture.

Referring again to FIG. 2, and according to another embodiment of the present disclosure, the melt system 200 Includes a power source 234 and a control unit 236. The power source 234 is mechanically coupled to the rotatable longitudinal portion 220 of the mixing unit 218 and is configured to rotate the longitudinal portion 220 at a range of angular speeds.

The control unit 236 is electrical coupled to the power source 234 and the heating unit 216 of the chamber walls 204. The control unit 236 may include one or more of a processing unit 238, a memory 240 Including a database 242 and an input/output user interface 244. In one embodiment, the control unit 236 includes the processing unit 238, and the memory 240 and/or the i/O user interface 244 are components of an external computer or computing system (not shown).

In one embodiment, the control unit 236 may access the database 242 and receive user input via the user I/O interface 244 for determining a rotational speed of the longitudinal portion 220 of the mixing unit 218 and the predefined temperature (i.e., operating temperature) of the chamber 202. The control unit 236 may control the power source 234 for achieving the determined rotational speed and the heating element 216 for achieving the determined predefined temperature. The control unit 236 may also be electrically powered by the power source 234.

The processing unit 238 may be a central processing unit, such as a microprocessor and/or microcontroller, and the I/O interface 244 may include a display and operator input, such as a keypad or touch screen. The memory 240 may be configured to store an executable program that controls operation of the processing chamber 202. For example, the memory 240, or an external memory, external hard drive, and/or an external computer (not shown), may store the database 242 having a plurality of predefined processing chamber operating temperatures and/or a plurality of predefined processing chamber operating temperature ranges and/or sets of artificial turf compositions. Each predefined temperature and/or predefined temperature range corresponds to a unique set of artificial turf composition. For example, an artificial turf composition may include weight percentage of each component of an artificial turf, including percentages of one or more of sand, other infills, polypropylene, polyethylene, polyurethane, thermoplastic, thermoset material and adhesives. In one embodiment, an operator may input, via the I/O interface 244, a composition of the artificial turf being processed by the melt system 200, a predefined maximum pressure (or a predefined maximum pressure range), a mixing rate and/or a throughput rate, or any combination thereof.

The control unit 236, upon reception of operator input, such as predefined temperature, predefined maximum pressure, artificial turf composition, mixing rate and/or throughput rate, executes a program (i.e., software) stored in the memory 240 for controlling the melt system 200. For example, the control unit 236 may control the length of processing time, chamber temperature, throughput rate, mixing rate and/or maximum pressure in the chamber 202 based only on operator input, only on data stored in the database 242, or a combination of both.

In one embodiment, the predefined chamber temperature is selected by the operator or determined by the control unit 236 based upon operator input of the composition of the artificial turf. The control unit 236 may then access the database 242 to determine the predefined temperature from a temperature/composition database table (not shown) of the database 242. In one embodiment, the predefined temperature (or temperature range) is greater or equal to the melt temperatures of each of the thermoplastic components of the artificial turf.

In another embodiment, the predefined maximum pressure of the processing chamber 202 is selected by the operator or determined by the control unit 236 based upon weight percentage of the infill of the artificial turf fragments. According to an embodiment, as the weight percentage of infill, or preferably as the weight percentage of abrasive infill, such as the mineral infill and/or one or more of the performance infills and/or one or more of the natural fiber infills of the artificial turf fragments increases, the predefined maximum pressure of the chamber 202 during processing of the fragments or material mixture, including rotationally mixing, heating, and moving forward the material 230 from input port 210 to output port 212, decreases, in order to reduce abrasion to the components of the melt system 200 (e.g., abrasion to the mixers 222, chamber walls 204, input/output ports 210, 212) and/or reduce production of frictional heat that may cause temperature variations throughout the material 230 in the chamber 202.

In another embodiment, the predefined maximum pressure, as determined by the control unit 236 or as received by the control unit 236 as operator input, may be used by the control unit 236 to determine a maximum throughput rate of the material 230 and/or a maximum mixing rate (e.g., a rotational speed of the longitudinal portion 220 of the mixing unit 226) for rotationally mixing the material 230 inside the chamber 202, above which the pressure inside the chamber 202 may exceed the predefined maximum pressure.

The control unit 236 may include, but are not limited to, one or more processors or processing units, a storage system, a memory unit, and a bus that couples various system components including memory unit to processor. Storage system may include for example a hard disk drive (HDD). Memory unit may include computer system readable media in the form of volatile memory, such as random access memory (RAM) and/or cache memory.

Figure 5:
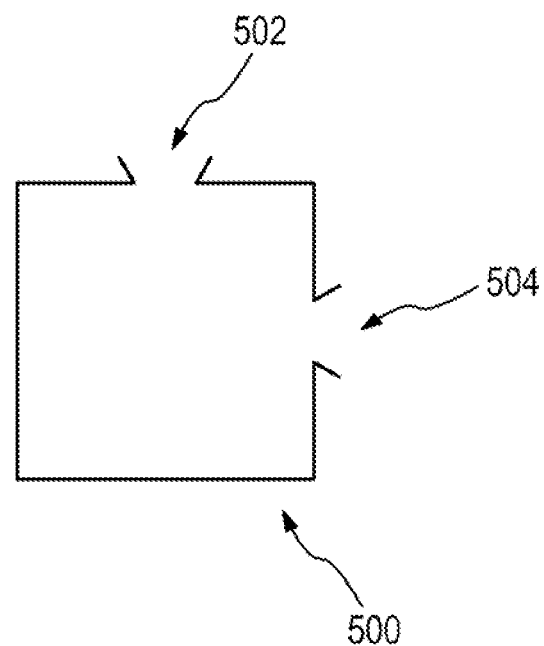
FIG. 5 is a schematic of a primary mixer, according to an embodiment of the present disclosure.

FIG. 5 is a schematic of a primary mixer 500, according to an embodiment of the present disclosure. The primary mixer 500 has an input 502 and an output 504. In one embodiment according to the present disclosure, the input of the primary mixer 502 receives the artificial turf fragments and a mineral, such as sand. The sand separated in step 106 of FIG. 1 may be used as the mineral input into the primary mixer. In one embodiment, a predetermined amount of mineral is added to the primary mixer along with the artificial turf fragments. The predetermined amount of sand depends upon the amount of sand selected to be in the final molded product and upon the amount of residual mineral infill remaining in the artificial turf fragments. The primary mixer 500 receives the artificial turf fragments and the added mineral via the input 502, mixes the artificial turf fragments and the added mineral, and provides the material mixture via the output 504 to the one or more input ports 210 of the melt system 200.

In one embodiment, an amount of mineral is added such that the mineral content in the material mixture is up to 85 wt. % of the material mixture, and in a preferred embodiment, between 20-85 wt. %. For example, a mineral, such as sand, may be added to the primary mixer such the amount of sand is any one of 20-30 wt, %, 30-40 wt, %, 40-50 wt. %, 50-60 wt. %, 60-70 wt. %, 70-80 wt. % or 80-85 wt. % of the material mixture.

Primary mixers include conventional industrial mixers for mixing shredded and/or crushed products, such as downsized artificial turfs or other synthetic and/or non-synthetic fabrics. Primary mixers are well known in the art and will not be discussed in further detail.

Figure 6:
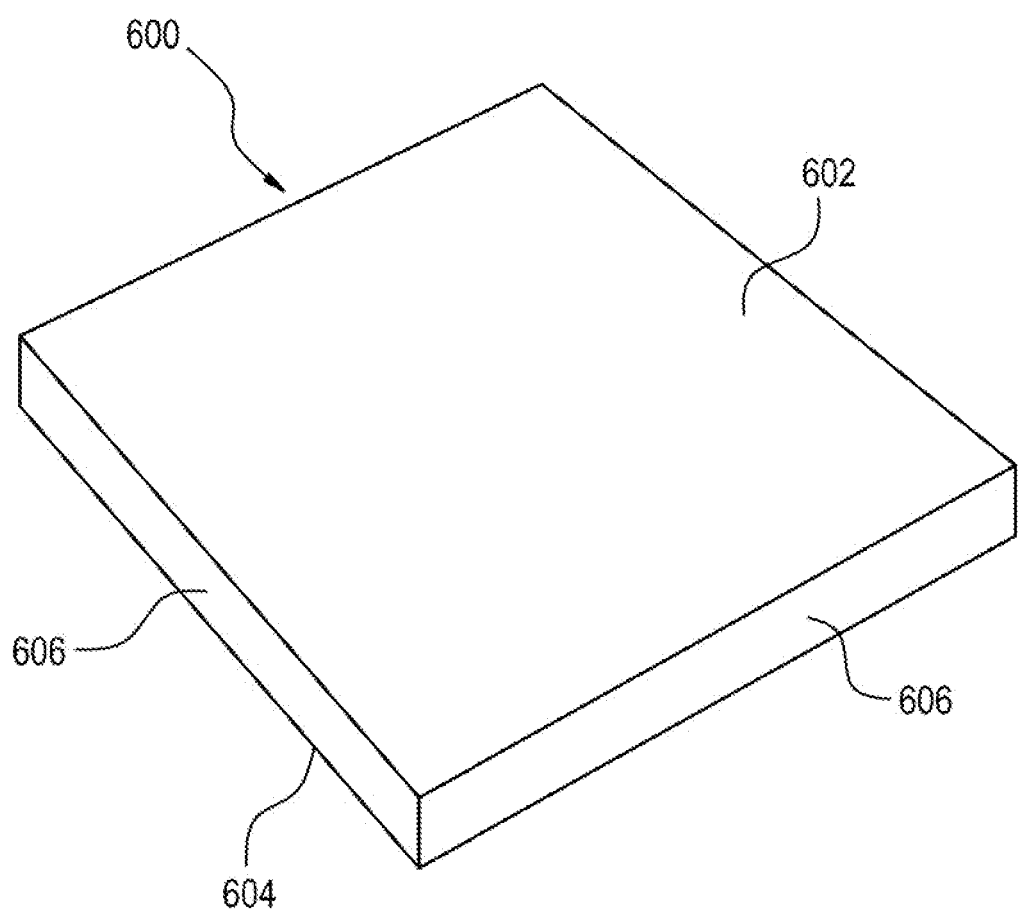
FIG. 6 is a schematic diagram of a floor panel formed by the method of FIG. 1 for processing an artificial turf, according to an embodiment of the present disclosure.

FIG. 6 is a schematic diagram of a floor panel 600 formed by the method for processing an artificial turf as disclosed herein, according to an embodiment of the present disclosure.

According to one embodiment, the floor panel 600 is a mold-cast product formed via the method for processing an artificial turf as disclosed herein. As described by step 114 of FIG. 1, the melt flows from the output port(s) In the form of one or more threads and may be directed to a molding process, including a filling of one or more floor molds configured as floor panel molds. In another embodiment, the one or more threads can be cut into segments as the threads leave the output port(s) to create cylindric material pieces, which can be temporarily stored in a material buffer before being directed into the one or floor panel molds.

In one embodiment, the one or more floor panel molds are configured to provide one or more one or more floor panels having an upper surface 602, a lower surface 604 substantially parallel to the upper surface, and one or more side surfaces 606 substantially perpendicular to the upper and lower surfaces. Although the floor panel 600 is shaped as a four-sided polygon, and in this exemplary embodiment a square or rectangular polygon, the scope of the present disclosure covers a floor panel of any shape and having any number of side surfaces, including only a single continuous side surface (i.e., a side surface that has no discontinuities, for example, no sharp edges or breaks in the surface of the side).

In one embodiment, the method 100 (FIG. 1) further comprises applying an adhesive to the one or more side surfaces 606 (optional step 116) for attaching each of the one or more side surfaces 606 to respective one or more side surfaces of one or more adjacent floor panels (not shown) for securing the floor panel to the one or more adjacent floor panels. Thus, several floor panels may be connected to one another to form a floor having floor panels that are locked in place. The scope of the present disclosure covers all adhesives, such as glues, tapes, etc.

Figure 7:
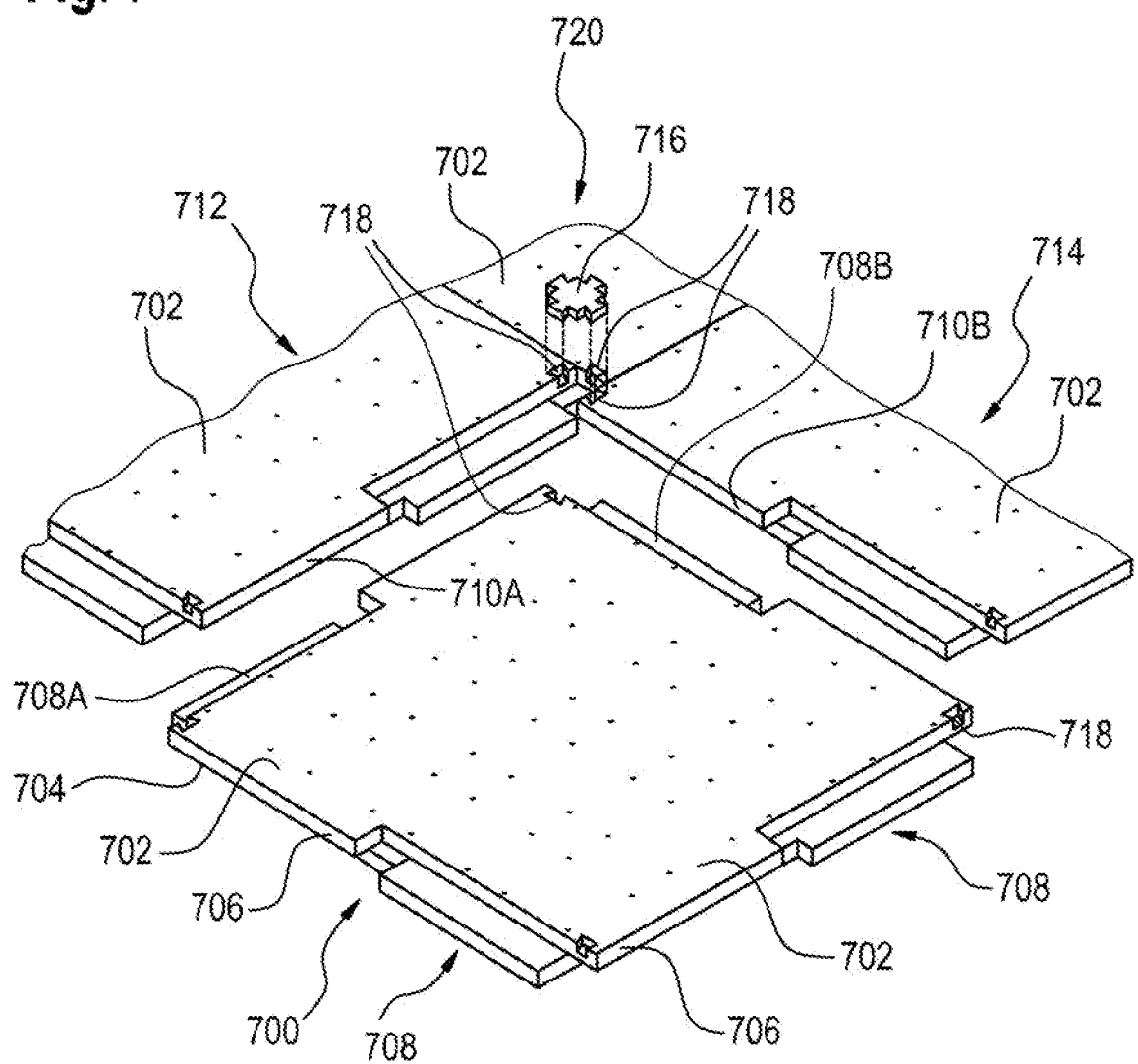
FIG. 7 is a schematic diagram of a floor panel formed by the method of FIG. 1 for processing an artificial turf, according to an embodiment of the present disclosure.

FIG. 7 is a schematic diagram of a floor panel 700 formed by the method for processing an artificial turf as disclosed herein, according to another embodiment of the present disclosure. According to one embodiment, the floor panel 700 Is a mold-cast product formed via the method for processing an artificial turf as disclosed herein.

In one embodiment, the one or more floor panel molds are configured to provide one or more one or more floor panels having an upper surface 702, a lower surface 704 substantially parallel to the upper surface, and one or more side surfaces 706. As illustrated, at least a portion of each side surface of the one or more side surfaces 706 includes one or more flanges 708. The flange 708 of each of the side surfaces 706 is configured to fit with respective flanges of side surfaces of adjacent floor panels for connecting the floor panel 700 with the adjacent floor panels. For example, flange 708A is configured to fit with complementarily-configured flange 710A of first adjacent floor panel 712 and flange 7088 is configured to fit with complementarily-configured flange 7108 of second adjacent floor panel 714.

FIG. 7 also illustrates an exemplary optional floor panel component 716 formed by the method for processing an artificial turf as disclosed herein, according to yet another embodiment of the present disclosure. According to one embodiment, the floor panel 716 Is a locking component formed as a mold-product via the method for processing an artificial turf as disclosed herein. However, the scope of the present disclosure covers any locking components commercially available, which are commonly known for securely fastening two or more panels or other items (e.g., wall panels, windows to window frames, etc.) together. The optional locking component 716 is configured to engage with optional complimentary locking component recesses 718 formed in the top surfaces 702 of adjacent floor panels 700, 712, 714 and 720 for locking the adjacent floor panels in place with one another. One or more of the floor panel molds (not shown) may be configured to provide the floor panel 700 with one or more locking component recesses 718.

However, the scope of the present disclosure covers floor panels having no locking component recesses. In this embodiment, the pairs of complementary flanges lock the adjacent floor panels 700, 712, 714 and 720 in place with one another without the optional locking component 716.

Figure 8:
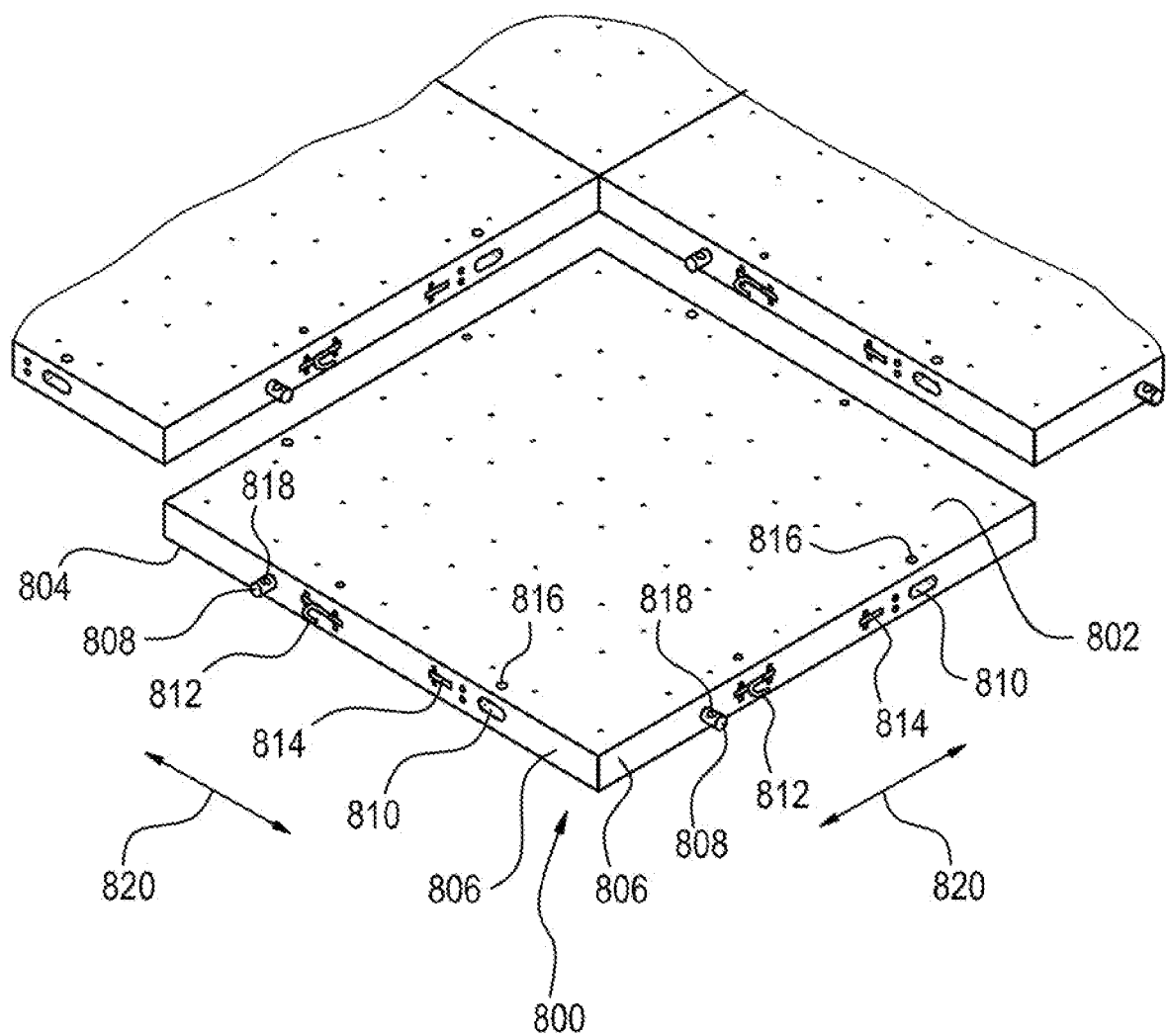
FIG. 8 is a schematic diagram of a floor panel formed by the method of FIG. 1 for processing an artificial turf, according to an embodiment of the present disclosure.

FIG. 8 is a schematic diagram of a floor panel 800 formed by the method for processing an artificial turf as disclosed herein, according to another embodiment of the present disclosure. According to one embodiment, the floor panel 800 is a mold-cast product formed via the method for processing an artificial turf as disclosed herein.

In one embodiment, the one or more floor panel molds are configured to provide one or more one or more floor panels having an upper surface 802, a lower surface 804 substantially parallel to the upper surface, and one or more side surfaces 806. As illustrated, at least a portion of each side surface of the one or more side surfaces 806 includes a dowel 808 and a dowel recess 810 (i.e., a recess configured for receiving a dowel of an adjacent floor panel) and/or a hook 812 and a hook recess 814 (i.e., a recess configured for receiving a hook of an adjacent floor panel). Although not illustrated, the scope of the present invention covers a floor panel, such as floor panel 800, where at least a portion of each side surface of the one or more side surfaces 806 includes any combination of one or more of the dowel 808 and the dowel recess 810, the hook 812 and the hook recess 814, and one or more of the flanges 708 as illustrated in FIG. 7.

The dowel 808 and/or the hook 812 may be either an integral, continuous portion of the floor panel 800 formed via the method for processing an artificial turf as disclosed herein, or floor panel components formed by the method for processing an artificial turf as disclosed herein, using respective floor panel component molds (not shown), which are then attached to the floor panel 800 via an adhesive or other means known in the art of attaching polymer-based products together, or commercially available dowels and hooks, which are then attached to the floor panel 800 via means known in the art.

In one embodiment, a peg or pin (not shown) may be inserted through a surface opening 816 and passed through a dowel opening 818 for securing (i.e., locking) the dowel 808 in place in its respective dowel recess 810. In another embodiment, upon inserting the hook 812 of the floor panel 800 into a hook recess of an adjacent neighboring floor panel, and upon the hook recess 810 receiving a hook of the adjacent neighboring floor panel, the floor panels may be moved laterally 820 with respect to one another such that the hooks 812 are locked into place within each respective hook recess. The dowel recesses 810 may be configured to allow a corresponding dowel 808 to slide laterally within the dowel recess 810 such that the dowel opening 818 are in line with their respective surface openings 816.

Figure 9:
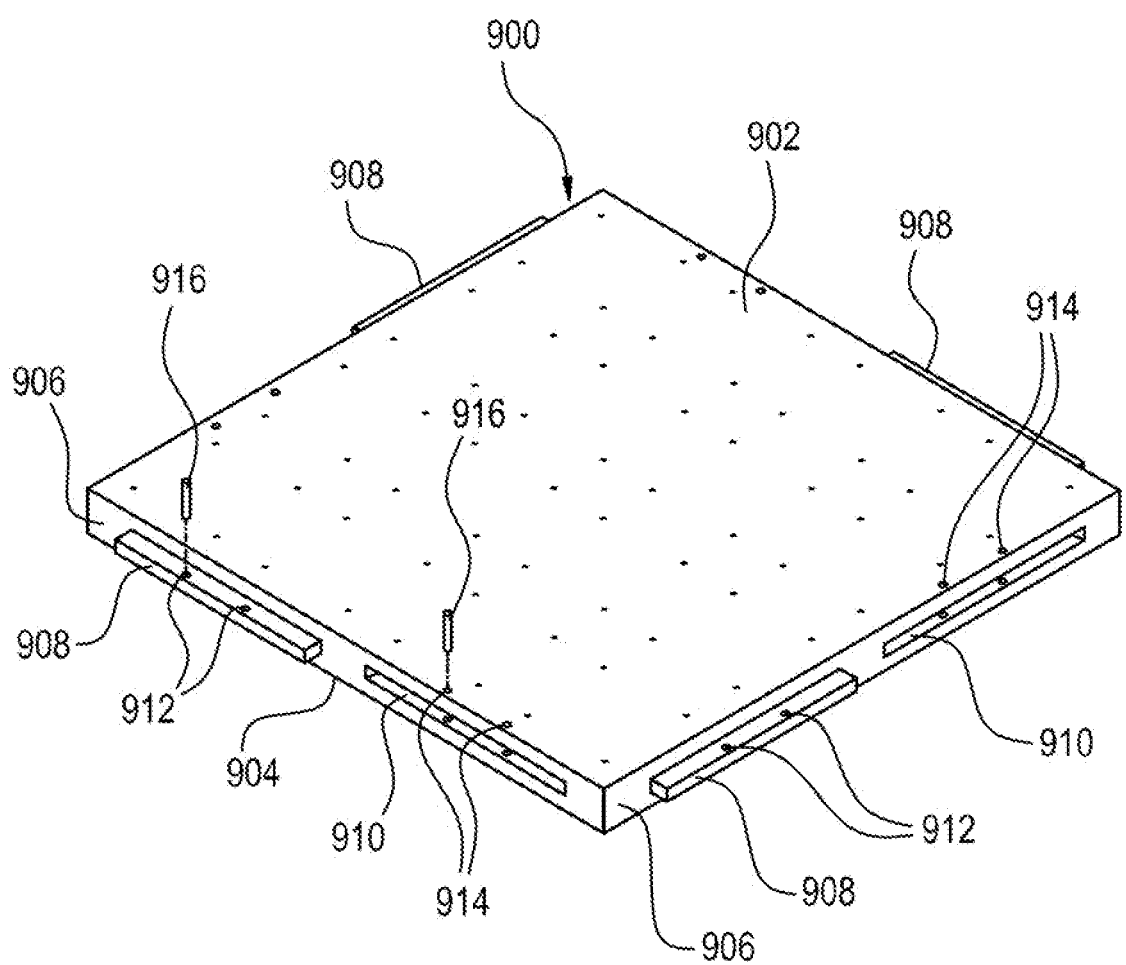
FIG. 9 is a schematic diagram of a floor panel formed by the method of FIG. 1 for processing an artificial turf, according to an embodiment of the present disclosure.

FIG. 9 is a schematic diagram of a floor panel 900 formed by the method for processing an artificial turf as disclosed herein, according to another embodiment of the present disclosure. According to one embodiment, the floor panel 900 is a mold-cast product formed via the method for processing an artificial turf as disclosed herein.

In one embodiment, the one or more floor panel molds are configured to provide one or more one or more floor panels having an upper surface 902, a lower surface 904 substantially parallel to the upper surface, and one or more side surfaces 906. The floor panel 900, as well as neighboring floor panels (not shown), configured in the same manner, have a tongue and groove locking mechanism for connecting floor panels together.

In one embodiment, at least a portion of each side surface 906 of the floor panel 900 is configured with a tongue 908 and a groove 910 for connecting the floor panel 900 with an adjacent floor panel (not shown) having a corresponding groove for receiving the tongue 908 and a corresponding tongue for reception into the groove 910. The tongue 908 and/or the groove 910 may be an integral, continuous portion of the floor panel 800 formed via the method for processing an artificial turf as disclosed herein, using one or more molds having respective structures for providing the floor panel 900 with the tongues 908 and grooves 910. Molds and mold-casting are well known, and one of skill in the art has the requisite knowledge to design one or more mold for forming the floor panel 900.

Optionally, the floor panel 900 includes tongue openings 912 and/or surface groove openings 914 to secure the adjacent floor panels together via pins or pegs 916 configured to be received by the surface groove openings 914 and passed through respective tongue openings 912 of tongues received into the respective grooves.

Figure 10:
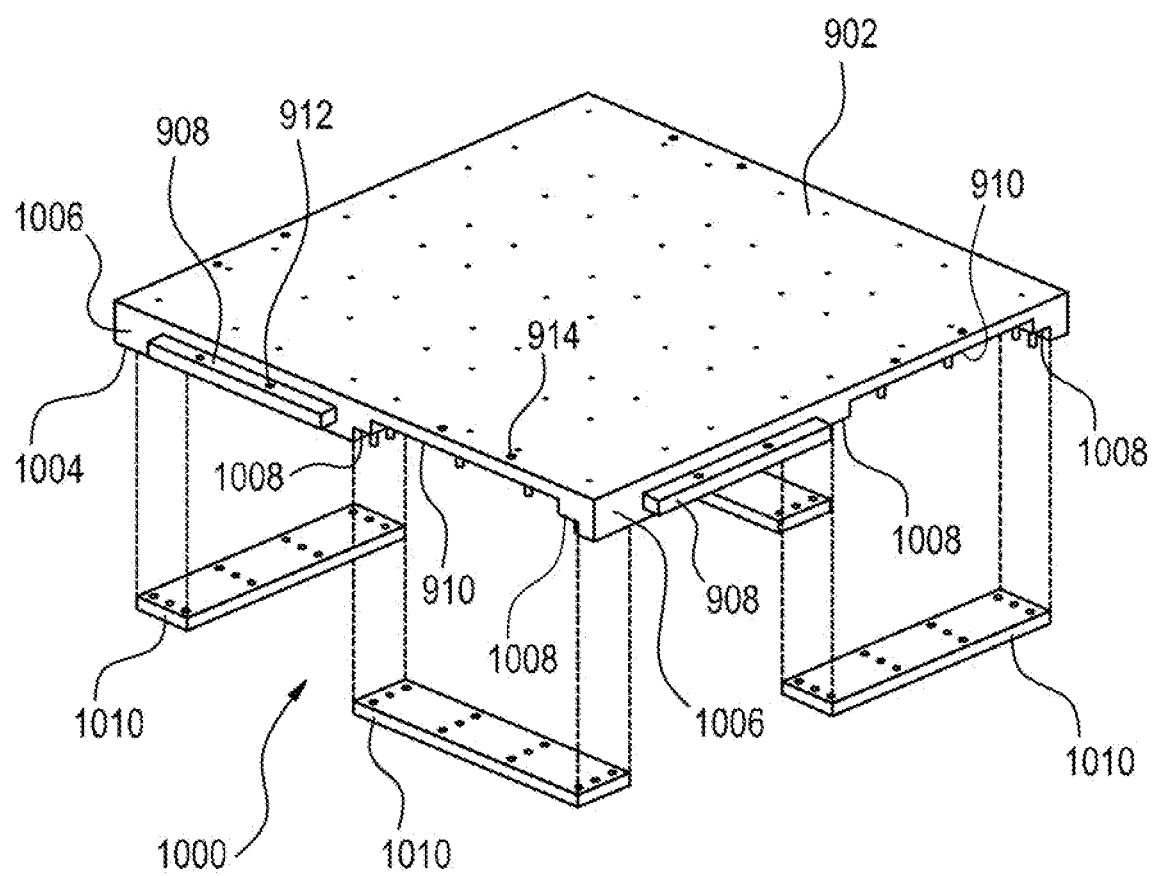
FIG. 10 is a schematic diagram of a floor panel formed by the method of FIG. 1 for processing an artificial turf, according to an embodiment of the present disclosure.

FIG. 10 is a schematic diagram of a floor panel 1000 formed by the method for processing an artificial turf as disclosed herein, according to another embodiment of the present disclosure. According to one embodiment, the floor panel 1000 is a mold-cast product formed via the method for processing an artificial turf as disclosed herein.

The floor panel 1000 is similar to the floor panel 900, with like reference numbers representing identical structures. In one embodiment, the one or more floor panel molds are configured to provide one or more one or more floor panels having an upper surface 902, a lower surface 1004 substantially parallel to the upper surface, and one or more side surfaces 1006. However, in contrast to forming the slots 910 as disclosed in conjunction with floor panel 900 as illustrated by FIG. 9, which are formed during the molding process using one or more molds having corresponding structures for creating the slots 910 of floor panel 900, the one or more molds associated with the manufacture of floor panel 1000 are configured for providing one or more flanges 1008 in the bottom surface 1004 of the floor panel 1000 and for providing one or more floor panel components (e.g., one or more plates 1010) configured to be received by the one or more flanges 1008 for forming the one or more slots 910 of floor panel 1000 as illustrated.

The floor panel 1000, as well as neighboring floor panels (not shown), configured in the same manner, have a tongue and groove locking mechanism for connecting floor panels together.

Computer systems typically includes a variety of computer system readable media. Such media may be any available media that is accessible by computer systems, and it includes both volatile and non-volatile media, removable and nonremovable media.

Aspects of the present disclosure are described herein with reference to flowchart illustrations and/or block diagrams of methods, apparatus (systems), and computer program products according to embodiments of the Invention. It will be understood that each block of the flowchart illustrations and/or block diagrams, and combinations of blocks in the flowchart illustrations and/or block diagrams, can be implemented by computer readable program Instructions.

Embodiments of the present disclosure may be a system, a method, a product, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (OVO), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiberoptic cable), or electrical signals transmitted through a wire.

The invention claimed is:

1. A method for processing an artificial turf, comprising:
providing an artificial turf, the artificial turf including an infill;
separating at least a portion of the infill from the artificial turf;
downsizing the artificial turf into artificial turf fragments;
rotationally mixing and transporting the artificial turf fragments at a pressure less than a maximum predefined pressure to form a melt, wherein the maximum predefined pressure is between 0.08-20 bar; and
pre-mixing the artificial turf fragments with the separated infill for forming a mixed material including up to 85 wt. % of the infill, wherein the rotationally mixing and transporting the artificial turf fragments comprises rotationally mixing and transporting the mixed material.

2. The method of claim 1, wherein the infill comprises at least one of a mineral infill and an elastomeric infill.

3. The method of claim 1, wherein the melt comprises the infill suspended as particulate in the melt.

4. The method of claim 1, wherein separating the infill from the artificial turf comprises separating a minimum of 60 wt. % of the infill from the artificial turf.

5. The method of claim 1, wherein the artificial turf fragments have an average size of about 0.1 cm-25-cm.

6. The method of claim 5, wherein the artificial turf fragments have an average size of about 0.5 cm-5 cm.

7. The method of claim 1, wherein rotationally mixing and transporting the artificial turf fragments at a pressure less than a maximum predefined pressure to form a melt further comprises rotationally mixing and transporting the artificial turf fragments at a predefined temperature, the predefined temperature based upon one or more melt temperatures of one or more thermoplastic components of the artificial turf fragments.

8. The method of claim 1, wherein rotationally mixing and transporting the artificial turf fragments comprises rotationally mixing and transporting the artificial turf fragments in a chamber, the chamber having a proximate end, a distal end, at least one input port positioned at the proximate end for receiving the artificial turf fragments, and at least one output port positioned at the distal end through which the melt flows, and wherein the transporting further comprises translationally transporting the artificial turf fragments toward the distal end of the chamber.

9. The method of claim 8, wherein pressure in the chamber is less than or equal to the maximum predefined pressure, wherein the maximum predefined pressure is less than 8 bar, and wherein the pressure in the chamber is created solely by translationally transporting the artificial turf fragments in the chamber.

10. The method of claim 1, further comprising adding at least one additive to the artificial turf fragments.

11. The method of claim 10, wherein the additive includes at least one of: one or more pigments, one or more polymers, one or more flame retardants and a measured amount of a mineral.

12. The method of claim 1, further comprising placing the melt into one or more molds for providing a mold-cast product.

\* \* \* \* \*